United States Patent [19]

Hashimoto et al.

[11] Patent Number: 5,254,404
[45] Date of Patent: Oct. 19, 1993

[54] MAGNETIC RECORDING MEDIUM COMPRISING FERROMAGNETIC PARTICLES HAVING CRYSTALLITE SIZE OF LESS THAN 450 ANGSTROMS AND A SPECIFIED POLYURETHANE BINDER

[75] Inventors: Hiroshi Hashimoto; Akira Ushimaru, both of Kanagawa, Japan

[73] Assignee: Fuji Photo Film Co., Ltd., Kanagawa, Japan

[21] Appl. No.: 884,273

[22] Filed: May 13, 1992

Related U.S. Application Data

[63] Continuation of Ser. No. 551,820, Jul. 12, 1990, abandoned.

[30] Foreign Application Priority Data

Jul. 12, 1989 [JP] Japan .................................. 1-179670

[51] Int. Cl.$^5$ .............................................. G11B 5/00
[52] U.S. Cl. ........................................ 428/323; 428/328; 428/329; 428/425.9; 428/694 MT; 428/900
[58] Field of Search ............ 428/424.6, 425.9, 694, 428/900, 323, 328, 329; 252/62.54

[56] References Cited

U.S. PATENT DOCUMENTS

| | | | |
|---|---|---|---|
| 4,323,621 | 4/1982 | Kober et al. | 428/216 |
| 4,400,498 | 8/1983 | Konishi et al. | 528/60 |
| 4,457,982 | 7/1984 | Rudolf et al. | 428/403 |
| 4,686,145 | 8/1987 | Honda et al. | 428/425.9 |
| 4,784,907 | 11/1988 | Matsufuji et al. | 428/328 |
| 4,784,914 | 11/1988 | Matsufuji et al. | 428/418 |

FOREIGN PATENT DOCUMENTS 62-226418  10/1987  Japan .

*Primary Examiner*—Stevan A. Resan
*Attorney, Agent, or Firm*—Sughrue, Mion, Zinn, Macpeak & Seas

[57] ABSTRACT

A magnetic recording medium is disclosed, comprising a non-magnetic support having thereon at least one magnetic recording layer comprising a dispersion of ferromagnetic particles in a binder, said binder comprising the combination of a polyisocyanate and a polyurethane binder comprising at least one terminal hydroxyl group at each end of the polyurethane molecule, said polyurethane binder being prepared by reacting (a) a polyurethane prepolymer comprising at least one terminal isocyanate group at each end of the polyurethane prepolymer molecule, said polyurethane prepolymer having a glass transition temperature of at least 0° C. and containing a polar group, with (b) a compound comprising at least one terminal hydroxyl group at each end of the polymer molecule and having a glass transition temperature of −30° C. or less.

4 Claims, No Drawings

1 …

MAGNETIC RECORDING MEDIUM COMPRISING FERROMAGNETIC PARTICLES HAVING CRYSTALLITE SIZE OF LESS THAN 450 ANGSTROMS AND A SPECIFIED POLYURETHANE BINDER

This is a continuation of application Ser. No. 07/551,820 filed Jul. 12, 1990 now abandoned.

FIELD OF THE INVENTION

The present invention relates to a magnetic recording medium. More particularly, it relates to a magnetic recording medium having excellent electromagnetic characteristics and running durability.

BACKGROUND OF THE INVENTION

Magnetic tape, which is a general-purpose magnetic recording medium, is typically produced by dispersing acicular ferromagnetic particles having a length in the long axis of 1 μm or less in a binder solution along with appropriate additives (e.g., a dispersant, lubricant, and antistatic agent) to prepare a magnetic coating composition and then applying this coating composition on a poly(ethylene terephthalate) film (nonmagnetic support).

Binders for magnetic recording media are required, for example, to disperse ferromagnetic particles and hold them at high packing densities, to have no adverse effect on the orientation of the ferromagnetic particles, to give magnetic layers having good durability, abrasion resistance, heat resistance, and smoothness, and to have good adhesion to the nonmagnetic supports. Thus, binders are highly important. Conventionally employed binder resins include vinyl chloride-vinyl acetate copolymers, vinyl chloride-vinyl acetate-vinyl alcohol copolymers, vinyl chloride-vinylidene chloride copolymers, polyurethane resins, polyester resins, acrylonitrile-butadiene copolymers, nitrocellulose, cellulose acetate butyrate, epoxy resins, and acrylic resins.

Of those resins, polyurethane resins are superior in toughness, abrasion resistance, and other properties due to the intermolecular hydrogen bonding in the urethane bonds, but are not always satisfactory.

Since adipate-based or caprolactone-based conventional polyurethane resins are poor in such properties as anti-blocking properties, heat resistance, and running stability, such polyurethane resins are used particularly in combination with nitrocellulose or vinyl chloride-vinyl acetate copolymers. However, these blends are still insufficient in durability, abrasion resistance, and running stability, in the fields of video tapes, computer tapes, and floppy disks, where high performance is required.

For the purpose of improving the durability, abrasion resistance, and other properties of magnetic recording media, polyisocyanates are used as hardeners and various kinds of polyurethane resins having improved hardening reactivity with polyisocyanates are developed.

For example, polyurethanes in which hydroxyl groups are incorporated in the side chains thereof by special methods or by use of special raw materials are known. The incorporation of hydroxyl groups is accomplished by, for example, a method in which an isocyanate-terminated prepolymer is polymerized by use of a low molecular weight compound having three or more functional groups, such as glycerol, trimethylolpropane, or pentaerythritol, as part or all of the chain extender(s) or a method in which epoxy groups are first incorporated into a polyurethane resin and the epoxy groups then undergo ring opening to yield hydroxyl groups.

These polyurethane resins, however, are disadvantageous in that gelation of the polyurethane resins may occur during the production thereof and that the production process necessitates additional steps. The most serious problem encountered when such a polyurethane resin is used as a binder for ferromagnetic particles for magnetic recording media is that the more the hardening reactivity of the polyurethane resin with polyisocyanates is improved, the less the conventional polyurethane resins' ability to disperse ferromagnetic particles.

In order for magnetic recording media to show improved S/N ratios (signal-to-noise ratios) and to be recorded with information at high densities, the magnetic layers contain ferromagnetic particles which have smaller particle sizes and have been incorporated at high packing densities and oriented to high degrees, or the magnetic layers employ ferromagnetic particles that are more difficult to disperse, such as ferromagnetic metal particles.

The conventional polyurethane resins fail to meet the requirements for producing such high-performance magnetic recording media.

As described above, the conventional polyurethane resins cannot satisfy the requirements for the production of magnetic recording media which show improved S/N ratios and can be recorded with information at high recording densities, because the more the hardening reactivity of the polyurethane resins with polyisocyanates used as hardener is increased, to improve abrasion resistance or durability of magnetic recording media, the poorer is their ability to disperse magnetic particles.

It has thus been proposed to use, as a binder ingredient for magnetic layers, a polyurethane resin which has high reactivity with hardeners and good ability to disperse ferromagnetic particles. JP-A-62-226418 discloses a magnetic recording medium employing a polyurethane resin obtained by the reaction of an isocyanate-terminated prepolymer with a branched polyester polyol having a molecular weight of 500 to 5,000 in which a polycarboxylic acid or polyol having 3 or more carboxyl or hydroxyl groups has been copolymerized in an amount of 1 to 20 mol% based on the total amount of all the acid or alcohol ingredients copolymerized. (The term "JP-A" as used herein means an "unexamined published Japanese patent application".) However, since the isocyanate-terminated prepolymer and the polyester polyol both have high molecular weights and high glass transition temperatures (Tg), the reactivity of the above-proposed polyurethane resin with hardeners remains insufficient.

SUMMARY OF THE INVENTION

An object of the present invention is to provide a magnetic recording medium having in its magnetic layer a binder that is superior in the ability to disperse ferromagnetic particles and imparting excellent surface smoothness to the magnetic layer after calendering, and which has high durability.

DETAILED DESCRIPTION OF THE INVENTION

The above object of the present invention is accomplished by a magnetic recording medium comprising a non-magnetic support having thereon at least one magnetic recording layer comprising a dispersion of ferromagnetic particles in a binder, said binder comprising the combination of a polyisocyanate and a polyurethane binder comprising at least one terminal hydroxyl group at each end of the polyurethane molecule, said polyurethane binder being prepared by reacting (a) a polyurethane prepolymer comprising at least one terminal isocyanate group at each end of the polyurethane prepolymer molecule, said polyurethane prepolymer having a glass transition temperature of at least 0° C. and containing a polar group, with (b) a compound comprising at least one terminal hydroxyl group at each end of the prepolymer molecule and having a glass transition temperature of $-30°$ C. or less.

According to the present invention, the mechanical strength and durability of the binder are improved by use of polyurethane prepolymer, hereinafter referred to as "polyurethane (A)", which has a Tg of 0° C. or higher and contains a polar group, as the main chain of the polyurethane binder. Furthermore, by bonding the compound containing at least one terminal OH group at each end of the polymer molecular and having a Tg of $-30°$ C. or less (hereinafter referred to as "compound (B)") to both ends of the molecule of polyurethane (A), there can be obtained the final polyurethane binder (hereinafter referred to as "polyurethane (C)") having OH groups that are easily reacted with a hardener having a high molecular motion property, and this polyurethane binder strongly reacts with polyisocyanate (hereinafter referred to as "polyisocyanate (D)"). Therefore, the resulting binder provides excellent dispersion of ferromagnetic particles and imparts excellent smoothness to the magnetic layer, and the magnetic recording medium obtained has an excellent durability.

Polyurethane (A) having a Tg of 0° C. or higher (preferably 0 to 70° C.) and containing a polar group generally has a weight-average molecular weight $\overline{MW}$ of from 10,000 to 100,000, preferably from 40,000 to 60,000, and the polar group is preferably at least one group selected from the group consisting of $-SO_3M$,

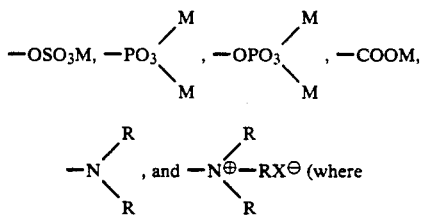

M represents hydrogen, an alkali metal, or ammonium group; R represents an alkyl group, and X represents a halogen atom). The particularly preferred polar groups are $-OSO_3Na$ and $-COOH$. It is also preferred that polyurethane (A) further contains an epoxy group and an OH group. The content of these polar groups in polyurethane (A) is generally from $1 \times 10^{-5}$ to $50 \times 10^{-1}$ equivalents, preferably from $2 \times 10^{-5}$ to $20 \times 10^{-5}$ equivalents, per g of the polymer.

Such a polyurethane (A) can be produced as follows, and specific examples thereof are given below.

A polyol such as a polar group-containing polyester polyol, polyether polyol, or polycarbonate polyol is reacted with an organic diisocyanate in the presence of a low molecular weight diol as a chain extender to synthesize a polyurethane. In this process, an isocyanate-terminated polyurethane can be obtained by properly regulating the molar ratio of the polyol to the diol to the diisocyanate.

The polar group-containing polyols can be synthesized by known methods such as that described in JP-A-62-226418.

Polyurethane (A) used to produce the binder to be employed in the present invention is characterized in that its Tg is 0° C. or higher and its molecule is terminated by an isocyanate group. If the Tg of polyurethane (A) is less than 0° C., the mechanical strength of the resulting magnetic layer as a whole is so low that the durability of the magnetic layer cannot be improved, although such polyurethane (A) imparts good curability to the resulting polyurethane (C). The terminal isocyanate group is a functional group that serves to bond compound (B) described below to polyurethane (A).

Compound (B) used to produce the binder to be employed in the present invention has a Tg of $-30°$ C. or lower and preferably has a branched structure. This compound (B) preferably has a molecular weight of from 300 to 1,500 and contains 3 or more $-OH$ groups per the molecule (when it has a branched structure), and the number of branches present in compound (B) is preferably from 1 to 5 per the molecule. The backbone of the molecule of compound (B) preferably is a hydrocarbon, polyester, or polyether having a Tg of $-30°$ C. or lower.

If the Tg of compound (B) is more than $-30°$ C. or the molecular weight thereof is less than 300, the branches to which $-OH$ groups are bonded show low molecular motion property and insufficient hardening reactivity, resulting in a magnetic layer with impaired durability. If the molecular weight thereof exceeds 1,500, the Tg of the whole binder becomes too low, resulting in a magnetic layer with impaired durability. Therefore, compound (B) preferably has a Tg and a molecular weight in the respective ranges specified above, in order that the molecular motion property of the terminal $-OH$ groups in the product of the reaction of polyurethane (A) and compound (B) can be heightened and the curability of the reaction product can be improved without lowering the Tg and strength of the main part of the reaction product described above.

Polyurethane (C), which is a polyurethane binder used to form the magnetic layer in the magnetic recording medium of the present invention, can be obtained by reacting polyurethane (A) with compound (B).

In the magnetic recording medium of this invention, the content of the above-described polyurethane (C) in the binder is generally from 10 to 70% by weight, preferably from 15 to 40% by weight, based on the total amount of the binder. If the content of the above-described polyurethane (C) in the binder is below the lower limit specified above, the running properties and durability of the resulting magnetic layer are impaired, while if the content thereof exceeds the upper limit, the magnetic layer has poor running properties, often resulting contamination of magnetic head.

The polyisocyanate (D) which is one ingredient for forming the binder employed in the magnetic recording medium of the present invention is a compound having 2 or more isocyanate groups per molecule. Examples of the polyisocyanates (D) include isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate; the reaction products of these isocyanates and polyalcohols; and polyisocyanates produced by the condensation of these isocyanates. The above-mentioned polyisocyanates are commercially available under the trade names of: Coronate L, Coronate HL, Coronate EH, Coronate 2030, Coronate 2031, Coronate 2036, Coronate 3015, Coronate 3041, Coronate 2014, Millionate MR, Millionate MTL, (manufactured by Nippon Polyurethane Co., Ltd., Japan); Takenate D-102, Takenate D-110N, Takenate D-200, and Takenate D-202 (manufactured by Takeda Chemical Industries, Ltd., Japan); Sumidule-N75 (manufactured by Sumitomo Bayer Co., Ltd., Japan); Desmodule L, Desmodule IL, Desmodule N, and Desmodule HL (manufactured by Bayer AG, West Germany); and Burnock-D850 and Burnock D802, manufactured by Dainippon Ink & Chemicals, Incorporated, Japan. Among these, Coronate L and Coronate HL are preferred.

The content of the polyisocyanates (D) in the binder is preferably such that the total amount of the isocyanate (—NCO) groups in the polyisocyanates (D) is generally from 2 to 100 times, preferably from 5 to 50 times, more preferably from 10 to 30 times, the total amount of the hydroxyl groups present in the above-described polyurethane (C) contained in the binder, in terms of equivalent. If the polyisocyanate content in the binder is below the lower limit specified above, the final magnetic recording medium not only has so poor running properties as to result in sticking of the magnetic recording medium, clogging of magnetic heads, or contaminating guide poles, but also shows deteriorated electromagnetic characteristics. On the other hand, if the polyisocyanate content is above the upper limit, the running durability, such as still durability, of the final magnetic recording medium may be deteriorated.

Along with the above-described polyurethane (C), other resins may be used to form the binder for use in the magnetic recording medium of the present invention. Such other resins that can be used in combination with the polyurethane (i.e., the polymers (C)) are not particularly limited, and those known thermoplastic resins, thermosetting resins, reactive resins, and mixtures thereof which have conventionally been employed as the binders for magnetic recording media can be used. It is preferable that the amount of the above-described polyurethane (C) in the binder is 10 to 70% by weight (particularly preferably 20 to 50% by weight); that the amount of the other resins that can be used along with the polyurethane (C) is 20 to 60% by weight (particularly preferably 30 to 50% by weight); and that the amount of the polyisocyanate is 10 to 50% by weight (particularly preferably 20 to 40% by weight); each based on the total amount of the binder.

Examples of the above thermoplastic resins include various kinds of synthetic thermoplastic resins having a softening temperature of 150° C. or lower and average molecular weights of from about 10,000 to 300,000. Specific examples of such thermoplastic resins include vinyl chloride-vinyl acetate copolymers, vinyl chloride-vinylidene chloride copolymers, vinyl chloride-acrylonitrile copolymers, acrylic acid ester-acrylonitrile copolymers, acrylic acid ester-vinylidene chloride copolymers, acrylic acid ester-styrene copolymers, methacrylic acid ester-acrylonitrile copolymers, methacrylic acid ester-vinylidene chloride copolymers, methacrylic acid ester-styrene copolymers, urethane elastomers, nylon-silicone resins, nitrocellulose-polyamide resins, poly(vinyl fluoride), vinylidene chloride-acrylonitrile copolymers, butadiene-acrylonitrile copolymers, polyamide resins, poly(vinyl butyral), cellulose derivatives (e.g., cellulose acetate butyrate, cellulose diacetate, cellulose triacetate, cellulose propionate, and nitro-cellulose), styrene-butadiene copolymers, polyester resins, chlorovinyl ether-acrylic acid ester copolymers, and amino resins. Preferred of these thermoplastic resins are vinyl chloride-based polymers or copolymers, vinylidene chloride-based polymers or copolymers, and nitrocellulose.

Examples of the above thermosetting or reactive resins include resins having a molecular weight of 200,000 or less when the resins are in coating composition states and having extremely increased molecular weight when the coating composition are coated, dried, and then heated. Specific examples of such thermosetting or reactive resins include phenolic resins, phenoxy resins, epoxy resins, urea resins, melamine resins, alkyd resins, silicone resins, acrylic reactive resins, epoxy-polyamide resins, nitrocellulosemelamine resins, a mixture of a high molecular weight polyester resin and an isocyanate prepolymer, a mixture of a methacrylic acid salt copolymer and a diisocyanate prepolymer, a mixture of a polyester polyol and a polyisocyanate, urea-formaldehyde resins, a mixture of a low molecular weight glycol, a high molecular weight diol, and triphenylmethane triisocyanate, polyamine resins, and mixtures thereof. Preferred of these are phenoxy resins and epoxy resins.

It is preferable that the above resins that can be used along with the polyurethane described hereinabove contain polar groups such as

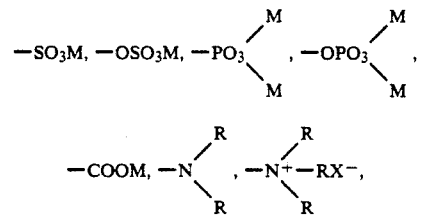

epoxy group, and —OH group (where M represents a hydrogen atom, an alkali metal, or an ammonium group, R represents an alkyl group, and X represents a halogen atom). The amount of such polar groups contained in these resins is generally from $1 \times 10^{-5}$ to $50 \times 10^{-5}$ eq, preferably from $2 \times 10^{-5}$ to $20 \times 10^{-5}$ eq, per g of the resin.

Particularly preferred resins that can be used along with the polyurethane (i.e., the polymer (C))are polar group-containing vinyl chloride resins, and specific examples thereof include "MR-110" (containing SO$_3$Na; Nippon Zeon Co., Ltd., Japan), "100 FD" (containing phosphoric acid; Denki Kagaku Kogyo K.K., Japan), and "MPR-TAO" (containing amine; Nissin Chemical Industry Co., Ltd., Japan). The dispersing ability of the magnetic coating composition can be improved by the combination of the resins.

In the magnetic recording medium of this invention, the proportion of the above-described binder to the ferromagnetic particles both incorporated in the magnetic layer is preferably such that the amount of the binder is from 15 to 35 parts by weight, particularly from 20 to 30 parts by weight, per 100 parts by weight of the ferromagnetic particles. If the amount of the binder incorporated is below the lower limit, the resulting magnetic recording medium shows poor running durability. If the amount thereof is above the upper limit, a low packing density of the ferromagnetic particles is decreased, so that desired electromagnetic characteristics cannot be obtained and the resulting magnetic layer tends to have increased coefficients of friction.

The ferromagnetic particles to be employed in the magnetic layer of the magnetic recording medium of the present invention may be any conventionally known ferromagnetic particles, as long as the crystallite sizes thereof are 450 Å or less. For example, γ-ferric oxide-based ferromagnetic particles, cobalt-doped γ-ferric oxide-based ferromagnetic particles, ferromagnetic metal or alloy fine particles, iron nitride-based ferromagnetic particles, barium ferrite, strontium ferrite, or the like may be used. Particularly preferred of these ferromagnetic particles are ferromagnetic metal or alloy particles.

The nonmagnetic support to be employed in the present invention is not particularly limited and can be any conventional support. Examples of the material for the nonmagnetic support include films of various synthetic resins such as poly(ethylene terephthalate), polypropylene, polycarbonates, poly(ethylene naphthalate), polyamides, polyamido-imides, and polyimides and metal foils such as an aluminum foil and a stainless-steel foil. The thickness of the nonmagnetic support also is not particularly limited, but is generally from 2.5 to 100 μm, preferably from 3 to 80 μm.

Besides employing a magnetic layer containing the specific binder as described above, the magnetic recording medium of the present invention may have the sam layer structure as that of conventional magnetic recording media. Hence, the conventional techniques can be suitably utilized.

For example, in preparing the magnetic layer of the magnetic recording medium of the present invention, the ferromagnetic particles and the binder are kneaded with a solvent along with known additives such as an organic or inorganic filler, carbon black, a dispersant, an antistatic agent, a lubricant, and an abrasive agent, to prepare a magnetic coating composition.

The above filler is not particularly limited, and for example, a particulate filler for ordinary use having an average particle diameter of 0.01 to 0.8 μm, preferably from 0.06 to 0.4 μm can be used. Examples of such a filler include particles of graphite, tungsten disulfide, boron nitride, calcium carbonate, aluminum oxide, iron oxide, titanium dioxide, magnesium oxide, zinc oxide, calcium oxide, lithopone, and talc. These fillers may be used alone or in combination.

Examples of carbon black which can be employed in the present invention include furnace black, thermal black, black for coloring, and acetylene black. Preferred carbon black is one having an average particle size of from 5 to 1,000 mμ (electron microscope), a specific surface area as measured by the nitrogen adsorption method of from 1 to 800 m²/g, a pH of from 4 to 11 (JIS K6221), and an oil absorption as measured with dibutyl phthalate of from 10 to 800 ml/100 g (JIS K6221). Regarding the size of carbon black, carbon black of from 5 to 100 mμ may be used in order to reduce the surface electric resistance of a coating film, and carbon black of from 50 to 1,000 mμ may be used in order to control the strength of a coating film. Further, finer carbon black (100 mμ or less) may be used in order to control the surface roughness of a coating film so as to smooth the surface and reduce the spacing loss, while coarse carbon black (50 mμ or more) may be used to roughen the surface of a coating film to decrease its friction coefficient. Fine carbon black and coarse carbon black may be used in combination. Carbon black in which part of its surfaces have been graphitized or grafted may be used.

Examples of dispersants include the following known dispersing agents: fatty acids having 10 to 22 carbon atoms (e.g., caprylic acid, capric acid, lauric acid, myristic acid, palmitic acid, stearic acid, oleic acid, elaidic acid, linoleic acid, linolenic acid, and stearolic acid), metallic soaps prepared from the above fatty acids and either an alkali metal (e.g., lithium, sodium, or potassium) or an alkaline earth metal (e.g., magnesium, calcium, or barium), esters of the above fatty acids, compounds obtained by substituting part or all of the hydrogen atoms in the above esters with fluorine atoms, amides of the above fatty acids, amines of the above aliphatic acid, higher alcohols, poly(alkylene oxido)alkyl esters of phosphoric acid, alkyl esters of phosphoric acid, alkyl esters of boric acid, sarcosinates, alkyl ether esters, trialkylpolyolefinoxy quaternary ammonium salts, and lecithin. In the case where a dispersant is used, the amount thereof is generally in the range of from 0.05 to 20 parts by weight per 100 parts by weight of the binder used.

Examples of antistatic agents include electroconductive fine particles such a carbon black and carbon black graft polymer powder; natural surfactants such as saponin; nonionic surfactants such as ones of the alkylene oxide type, the glycerin type, and the glycidol type; cationic surfactants such as (higher alkyl)amines, quaternary ammonium salts, salts of heterocyclic compounds including pyridine, and phosphonium or sulfonium compounds; anionic surfactants containing an acid radical such as a carboxylic, sulfonic, or phosphoric acid radical or a sulfuric or phosphoric ester radical; and amphoteric surfactants such as amino acids, aminosulfonic acids, and esters of sulfuric or phosphoric acid with amino-alcohols. When the abovementioned electroconductive fine particles are employed as an antistatic agent, the amount thereof may be, for example, in the range of generally from 0.2 to 20 parts by weight per 100 parts by weight of the binder. Where a surfactant is employed, it is generally used in an amount of from 0.1 to 10 parts by weight per 100 parts by weight of the binder.

Examples of lubricants include known lubricants such as the above-mentioned fatty acids, higher alcohols, esters of monobasic fatty acids having 12 to 20 carbon atoms with mono- or polyhydric alcohols having 3 to 20 carbon atoms (e.g., butyl stearate and sorbitan oleate), mineral oils, animal or vegetable oils, low molecular weight olefin polymers, low molecular weight α-olefin polymers, silicone oils, graphite fine powders, molybdenum disulfide fine powders, and Teflon fine powder, and further include lubricants for plastics. The amount of the lubricant added may be freely determined according to known techniques.

Examples of abrasive agents include $TiO_2$, $TiO$, $ZnO$, $CaO$, $SnO_2$, $SiO_2$, $\alpha\text{-}Fe_2O_3$, $Cr_2O_3$, $\alpha\text{-}Al_2O_3$, $ZnS$, $MoS_2$, $BaSO_4$, $CaSO_4$, $MgCO_3$, $BN$, and $SiC$. These inorganic fillers may be used alone or in combination of two or more thereof. The amount of the abrasive agents incorporated is generally in the range of from 0.01 to 50 parts by weight per 100 parts by weight of the binder.

The solvent to be employed in kneading is not particularly limited, and it can be one which is conventionally used to prepare magnetic coating compositions.

The method for kneading is also not particularly limited, and the order of the introduction of the ingredients can be optionally determined.

In preparing the magnetic coating composition, an ordinary employed kneading machine can be used. Examples thereof include a two-rod roll mill, a three-rod roll mill, a ball mill, a pebble mill, a Trommel mill, a sand grinder, a Szegvari attritor, a high-speed impeller, a dispersing machine, a high-speed stone mill, a high-speed impact mill, a Disper, a kneader, a high-speed mixer, a homogenizer, and an ultrasonic dispersing machine.

Each of the above-mentioned dispersants, antistatic agents, lubricants, and other additives need not have a single function. For example, a dispersant may act also as a lubricant or as an antistatic agent. Therefore, the effects provided by the respective additives are, of course, not limited to the effects implied by the names of these additives. Further, when an additive having plural functions is employed, it is preferable that the amount of the additive used be fixed taking all these functions into consideration.

In addition to the above-described additives, a detergent-dispersant, a viscosity-index improver, a pour-point depressant, an anti-foaming agent, and the like may be added.

The thus-prepared magnetic coating composition is coated on the nonmagnetic support described hereinabove. The coating on the nonmagnetic support may be done directly or through an adhesive layer or the like.

As methods for the coating on the nonmagnetic support, there may be mentioned, for example, air doctor coating, blade coating, rod coating, extrusion coating, air knife coating, squeeze coating, dip coating, reverse roll coating, transfer roll coating, gravure coating, kiss coating, cast coating, spray coating, and spin coating. Coating methods other than the above may also be employed.

By such a method, the magnetic coating composition is applied in such an amount that the resulting magnetic layer has a dry thickness of generally from about 0.5 to 10 $\mu$m, preferably from 1.5 to 7.0 $\mu$m.

The magnetic layer thus formed on the nonmagnetic support is then treated to orient the ferromagnetic particles, and then dried. If desired, the magnetic layer is further subjected to a surface-smoothing treatment. Thereafter, the resulting magnetic recording medium is slit to a desired shape. The above treatment can be carried out according to the method described in U.S. Pat. Nos. 4,324,177, 4,466,164, 4,499,121 and 4,100,326.

The magnetic recording medium of the invention may have a known backing layer as described in U.S. Pat. No. 4,582,757, on the nonmagnetic support's surface opposite to the surface having the magnetic layer.

As described above, according to the present invention, the mechanical strength and durability of the binder and the ability to disperse ferromagnetic particles are all improved by use of polyurethane (A), which has a Tg of 0° C. or higher and contains a polar group, as the main chain of the polyurethane binder. Furthermore, by bonding compound (B) containing —OH groups and having a Tg of —30° C. or lower to both ends of the molecule of polyurethane (A), there can be obtained polyurethane (C) having —OH groups that are easily reacted with hardener having a high molecular motion property, and this binder strongly reacts with polyisocyanate (D). Therefore, the resulting binder can disperse ferromagnetic particles and impart excellent smoothness to the magnetic layer, and the magnetic recording medium obtained has a excellent durability.

Since the OH groups have been incorporated in the polyurethane main chain at the terminals thereof, the resulting binder's ability to disperse ferromagnetic particles is not impaired by the polar group. Further, since compound (B) linked to the terminals of polyurethane (A) has a low Tg and shows high molecular motion property because of side chains having moderate lengths, the resulting magnetic layer has good calendering properties and hence good smoothness, and the reaction product of compound (B) and polyurethane (A) has high reactivity with a polyisocyanate (D) so that improved durability of the resulting magnetic layer is attained. Furthermore, because the Tg of the polyurethane main chain is as high as 0° C. or more, the strength of the resulting magnetic layer as a whole is high and, hence, the durability of the layer is also good.

The present invention is now explained in greater detail with reference to the following Examples and Comparative Examples, but the present invention is not to be construed as being limited thereto. Unless otherwise indicated, all parts, percents and ratios are by weight.

EXAMPLES

Each of the polyurethane binders used in the Examples and Comparative Examples was synthesized from the monomers for the polymer backbone which are shown in Table 1, in accordance with conventional methods ("Gosei Koubunshi (Synthetic Polymers)" Vol. V, pp. 309–369, published by Asakura Syoten, Japan Jun. 15, 1971).

| Formulation for Magnetic Coating Composition | |
|---|---|
| Ferromagnetic Fe—Ni alloy particles (crystallite size: 250 Å, pH: 9) | 100 parts |
| Polyurethane | Kinds and |
| Other resin | amounts being |
| Polyisocyanate | given in Table 1 |
| Carbon black (average particle diameter: 40 nm, amount of oil absorption: 160 ml/100 g) | 2 parts |
| $\alpha$-Al$_2$O$_3$(average particle diameter: 200 nm) | 5 parts |
| Stearic acid | 1 part |
| Oleic acid | 1 part |
| Isoamyl stearate | 1 part |
| Butyl stearate | 1 part |
| Methyl ethyl ketone | 200 parts |
| Toluene | 50 parts |
| Cyclohexanone | 50 parts |

The above-listed ingredients excluding the polyisocyanate, stearic acid, and oleic acid were mixed for 50 hours by means of a ball mill to disperse the particulate ingredients. The remaining three ingredients were then added to the resulting dispersion, and this mixture was stirred to prepare a magnetic coating composition.

The magnetic coating composition obtained above was applied on the surface of a poly(ethylene terephthalate) base (nonmagnetic support) having a thickness of 10 $\mu$m, and the coating was subjected to magnetic orientation by means of a cobalt magnet, subsequently dried for 1 minute in an atmosphere of 100° C., and then calendered. The resulting coated base was heat-treated at 60° C. for 4 days and then slit into 8 mm widths, thereby preparing an 8-mm video tape sample.
The results obtained are summarized in Table 2.

TABLE 1

| | Polyurethane | | | | | | | | | |
|---|---|---|---|---|---|---|---|---|---|---|
| | Polyurethane (A) | | | | Compound (B) | | Binder (C) | Other binder | | Polyisocyanate (D) | |
| Sample No. | Backbone | Polar group (amount) | Tg (°C.) | Molecular weight $\overline{M}w$ (×10,000) | Structure | Tg (°C.) | (parts) | Kind | parts | Kind | parts |
| 1 | NPG/AA/ PA/MDI | —SO$_3$Na (6 × 10$^{-5}$ eq./g) | 20 | 4.5 | compound (a) | −50° C. | 8 | MR-110 (vinyl chloride) | 8 | Coronate L | 4 |
| 2 | NPG/AA/ PA/MDI | —SO$_3$Na (1 × 10$^{-5}$ eq./g) | " | " | compound (a) | " | " | MR-110 (vinyl chloride) | " | Coronate L | " |
| 3 | NPG/AA/ PA/MDI | — | " | " | compound (a) | " | " | MR-110 (vinyl chloride) | " | Coronate L | " |
| 4 | NPG/AA/ PA/MDI | —PO$_3$H$_2$ (10 × 10$^{-5}$ eq./g) | " | " | compound (a) | " | " | MR-110 (vinyl chloride) | " | Coronate L | " |
| 5 | NPG/AA/ PA/MDI | —N(C$_2$H$_5$)$_2$ (5 × 10$^{-5}$ eq./g) | " | " | compound (a) | " | " | MR-110 (vinyl chloride) | " | Coronate L | " |
| 6 | 1,4-BD/AA/ PA/MDI | —N(C$_2$H$_5$)$_2$ (5 × 10$^{-5}$ eq./g) | 25 | " | compound (a) | " | " | MR-110 (vinyl chloride) | " | Coronate L | " |
| 7 | polyhydroxy-caproic acid/ 1,4BD/PA/ TDI | —N(C$_2$H$_5$)$_2$ (5 × 10$^{-5}$ eq./g) | 0 | " | compound (a) | " | " | MR-110 (vinyl chloride) | " | Coronate L | " |
| 8 | 1,6-HD/NPG/ PA/IPDI | —N(C$_2$H$_5$)$_2$ (5 × 10$^{-5}$ eq./g) | −10 | " | compound (a) | " | " | MR-110 (vinyl chloride) | " | Coronate L | " |
| 9 | 1,6-HD/NPG/ PA/IPDI | —COOH (3 × 10$^{-5}$ eq./g) | 10 | 6 | compound (a) | −50° C. | 8 | MR-110 (vinyl chloride) | 8 | Coronate L | 4 |
| 10 | 1,5-HD/NPG/ PA/IPDI | —SO$_3$Na (6 × 10$^{-5}$ eq./g) | 10 | 4 | compound (b) | −40 | " | MR-110 (vinyl chloride) | " | Coronate L | " |
| 11 | 1,5-HD/NPG/ PA/IPDI | —SO$_3$Na (6 × 10$^{-5}$ eq./g) | " | " | compound (c) | −30 | " | MR-110 (vinyl chloride) | " | Coronate L | " |
| 12 | 1,5-HD/NPG/ PA/IPDI | —SO$_3$Na (6 × 10$^{-5}$ eq./g) | " | " | compound (d) | −20 | " | MR-110 (vinyl chloride) | " | Coronate L | " |
| 13 | 1,5-HD/NPG/ PA/IPDI | —SO$_3$Na (6 × 10$^{-5}$ eq./g) | " | " | — | — | " | MR-110 (vinyl chloride) | " | Coronate L | " |
| 14 | 1,5-HD/NPG/ PA/IPDI | —OSO$_3$K (6 × 10$^{-5}$ eq./g) | " | " | compound (a) | −50° C. | " | 100FD (vinyl chloride) | " | Coronate EH | " |
| 15 | 1,5-HD/NPG/ PA/IPDI | ⊖—N(C$_2$H$_5$)$_3$Cl⊖ (3 × 10$^{-5}$ eq./g) | " | " | compound (a) | " | " | MPR-YAD (vinyl chloride) | " | Sumidule N-75 | " |
| 16 | 1,5-HD/NPG/ PA/IPDI | —COOH (5 × 10$^{-5}$ eq./g) | " | " | compound (a) | " | " | MPR-YAD (vinyl chloride) | " | — | — |
| 17 | 1,5-HD/NPG/ PA/IPDI | —COOH (5 × 10$^{-5}$ eq./g) | 10 | 4 | compound (a) | −50 | 8 | 400 × 110A (vinyl chloride) | 8 | Coronate L | 4 |
| 18 | 1,5-HD/NPG/ | —COOH | " | " | compound | " | " | PKHH | " | Coronate | " |

TABLE 1-continued

| Sample No. | Polyurethane Polyurethane (A) Backbone | Polar group (amount) | Tg (°C.) | Molecular weight $\bar{M}w$ (×10,000) | Compound (B) Structure | Tg (°C.) | Binder (C) (parts) | Other binder Kind | parts | Polyisocyanate (D) Kind | parts |
|---|---|---|---|---|---|---|---|---|---|---|---|
| | PA/IPDI | (5 × 10⁻⁵ eq./g) | | | (a) | | | (phenoxy) | | L | |

Abbreviations for monomers used to form polyurethane backbones:
1,4-BD: 1,4-Butanediol
AA: Adipic acid
MDI: Diphenylmethane diisocyanate
TDI: Tolylene diisocyanate
1,6-HD: 1,6-Hexanediol
NPG: Neopentyl glycol
IPDI: Isophorone diisocyanate
HMDI: Hexamethylene diisocyanate
PA: Phthalic acid
Compound (B):
(a): $CH_3CH_3C[CH_2OCOC_{17}H_{35}OH]_3$
(b): $CH_3CH_2C[CH_2O\text{-}(CH_2CH_2O)_{\overline{5}}H]_3$
(c):
$CH_3CH_2C[CH_2O\text{-}(CCH_2CH_2CO\text{-}CH_2CH_2OCH_2CH_2O)_{\overline{2}}H]_3$
                  ‖                   ‖
                  O                   O (d): $CH_3CH_2C[(CH_2OC(CH_2)_8COOCH_2\overset{CH_3}{\underset{|}{C}}CH_2O)_{\overline{3}}H]_3$
                       ‖                              |
                       O                             CH_3

TABLE 2

| Sample No. | | Maximum Magnetic Flux Density (B m) (gauss) | Surface roughness*⁵ Ra (nm) | YS/N*¹ (db) | Clogging*² | Output decrease*³ | Calendar roll fouling*⁴ |
|---|---|---|---|---|---|---|---|
| 1 | Invention | 3120 | 4.1 | 1.5 | G | G | G |
| 2 | " | 3100 | 3.8 | 1.6 | G | G | G |
| 3 | Comparison | 2830 | 5.8 | −0.7 | B | M | M |
| 4 | Invention | 3090 | 3.8 | 1.4 | G | G | G |
| 5 | " | 3120 | 3.9 | 1.5 | G | G | G |
| 6 | " | 3080 | 4.2 | 1.4 | G | G | G |
| 7 | " | 3180 | 3.8 | 1.3 | G | G | G |
| 8 | Comparison | 3200 | 3.6 | 1.4 | B | B | B |
| 9 | Invention | 3190 | 3.8 | 1.3 | G | G | G |
| 10 | " | 3150 | 3.7 | 1.3 | G | G | G |
| 11 | " | 3130 | 3.7 | 1.4 | G | G | G |
| 12 | Comparison | 3190 | 3.8 | 1.5 | B | B | G |
| 13 | " | 3090 | 3.9 | 1.4 | B | B | G |
| 14 | Invention | 3120 | 3.8 | 1.2 | G | G | G |
| 15 | " | 3150 | 3.9 | 1.3 | G | G | G |
| 16 | Comparison | 3100 | 4.0 | 1.5 | B | B | B |
| 17 | Invention | 3030 | 4.1 | 0.4 | G | G | G |
| 18 | " | 3020 | 4.3 | ±0.0 | G | G | G |

*¹YS/N (signal to noise ratio of brilliance signal of video) was measured using an S/N meter, with signals being recorded and reproduced by using a 8 mm VTR, FUJIX-8 manufactured by Fuji Photo Film Co., Ltd.
*²Using the above VTR, each tape sample of 90-minute long was run 30 times. Samples which caused no clogging are shown by G, those which caused clogging 1 to 3 times are shown by M, and those which caused clogging 4 or more times are shown by B.
*³Using the above VTR, each tape sample of 90-minute long was run once. Samples which showed output decrease of 0 to −1 dB relative to the respective initial values are indicated by G, those showing output decrease of −1 to −2 dB are indicated by M, and those showing output decrease of −3 dB or more are indicated by B.
*⁴In the production process for each tape sample, calender rolls were examined for contamination after the sample of 200 m long was calendered at 80° C. under a liner pressure of 280 kg/cm. Samples whose magnetic layers partly peeled off and adhered to the calender rolls are shown by B, and those whose magnetic layers underwent no peeling are shown by G.
*⁵Surface roughness was measured according to JIS B 0601.

As is apparent from the results in Tables 1 and 2, when the specific polyurethane (c) according to the present invention was used, not only highly satisfactory electromagnetic characteristics and excellent durability can be attained, but contamination of calender roll in the production process can be prevented.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having thereon at least one magnetic recording layer comprising a dispersion of ferromagnetic particles in a binder, said ferromagnetic particles having a crystalline size of 450Å or less, said binder comprising the combination of a polyisocyanate and a polyurethane binder consisting essentially of at least one terminal hydroxyl group at each end of the polyurethane molecule, said polyurethane binder being prepared by reacting (a) a polyurethane prepolymer comprising at least one terminal isocyanate group at each end of the polyurethane prepolymer molecule, said polyurethane prepolymer having a glass transition temperature of at least 0° C. and containing a polar group, with (b) a compound comprising at least one terminal hydroxyl group at each end of the polymer molecule and having a glass transition temperature of −30° C. or less.

2. The magnetic recording medium as claimed in claim 1, wherein said binder further contains a vinyl chloride copolymer containing a polar group.

3. The magnetic recording medium as claimed in claim 1, wherein said polar group is at least one polar group selected from the group consisting of $-SO_3M$, $-OSO_3M$, $-PO_3M_2$, $-OPO_3M_2$, $-COOM$, $NR_2$, and $-N^+R_3X^-$, wherein M represents hydrogen atom, an alkali metal, or ammonium group, R represents an alkyl group, and X represents a halogen atom.

4. The magnetic recording medium as claimed in claim 2, wherein said polar group is at least one polar group selected from the group consisting of $-SO_3M$, $-OSO_3M$, $-PO_3M_2$, $-OPO_3M_2$, $-COOM$, $-NR_2$, and $-N^+R_3X^-$, wherein M represents hydrogen atom, an alkali metal, or ammonium group, R represents an alkyl group, and X represents a halogen atom.

* * * * *